United States Patent
Desch et al.

(10) Patent No.: US 9,900,335 B2
(45) Date of Patent: Feb. 20, 2018

(54) SYSTEMS AND METHODS FOR PRIORITIZING INDICATORS OF COMPROMISE

(71) Applicant: Visa International Service Association, San Francisco, CA (US)

(72) Inventors: Philip Desch, Ashburn, VA (US); Michael Eng, Sterling, VA (US)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 14/757,988

(22) Filed: Dec. 24, 2015

(65) Prior Publication Data

US 2017/0187741 A1  Jun. 29, 2017

(51) Int. Cl.
G06F 12/14 (2006.01)
H04L 29/06 (2006.01)

(52) U.S. Cl.
CPC ...... *H04L 63/1433* (2013.01); *H04L 63/1408* (2013.01)

(58) Field of Classification Search
None
See application file for complete search history.

(56) References Cited

U.S. PATENT DOCUMENTS

| | | | |
|---|---|---|---|
| 7,861,299 B1 | 12/2010 | Tidwell et al. | |
| 8,056,130 B1 * | 11/2011 | Njemanze | G06F 21/55 709/224 |
| 2003/0093514 A1 | 5/2003 | Valdes et al. | |
| 2004/0044912 A1 | 3/2004 | Connary et al. | |
| 2009/0276843 A1 | 11/2009 | Patel | |
| 2013/0046764 A1 * | 2/2013 | Choi | G06Q 10/06 707/740 |
| 2014/0136901 A1 * | 5/2014 | Butler | G06F 11/3051 714/38.1 |
| 2015/0058994 A1 | 2/2015 | Honig et al. | |
| 2015/0121153 A1 * | 4/2015 | Goutam | G06F 11/3409 714/47.3 |
| 2015/0381649 A1 * | 12/2015 | Schultz | H04L 63/1433 726/25 |

* cited by examiner

*Primary Examiner* — Brandon Hoffman
(74) *Attorney, Agent, or Firm* — Kilpatrick Townsend & Stockton, LLP (57) ABSTRACT

Techniques described herein include systems and methods for categorizing and prioritizing indicators of compromise for a network of network resources. The indicators of compromise may lead to security threats from malicious entities. In embodiments, a service provider computer receives information identifying an indicator of compromise for a network resource of a network associated with an organization. The information may include an identification of a severity for the indicator of compromise that is provided by a reporting entity. A normalized severity for the indicator of compromise may be calculated based at least in part on a set of factors. A lifecycle to associate with the indicator of compromise may be determined based on the normalized severity for the indicator of compromise. A report identifying the indicator of compromise and the normalized severity for the indicator of compromise may be generated and transmitted to an indicator of compromise information sharing network.

20 Claims, 5 Drawing Sheets

SYSTEMS AND METHODS FOR PRIORITIZING INDICATORS OF COMPROMISE

CROSS-REFERENCES TO RELATED APPLICATIONS

NOT APPLICABLE

BACKGROUND

Current technological advances have allowed for computer networks and systems to become integral components of businesses, government bodies, and other organizations. A large amount of information, either confidential or public, may transfer between entities over available networks and be susceptible to attack and intrusion. These attacks and intrusions may lead to identity theft or other theft of confidential information such as consumer's credit card information, personal contact information, and/or banking information. Various network security monitoring devices have been developed to help protect this sensitive information during transmission and storage from unauthorized person and/or entities. Further, entities seeking to protect this information may be part of an information sharing network that proliferates security threat information obtained by participating entities. However, while participating entities may benefit from the proliferation of said information, the amount of data transmitted quickly becomes cumbersome and difficult to utilize in an efficient and useful way. For example, entities may report or communicate up to 1 million security threat events to a particular organization and each event may require identification, analysis, and action by the organization. As the amount of security threat events received increases the complexity, difficulty, and resource requirements to properly address the events also grows leading to increased costs of operation for the organization and misuse of computational resources for the organization.

Embodiments of the invention address these and other problems individually and collectively.

BRIEF SUMMARY

In some embodiments of the invention, systems and methods for categorizing and prioritizing indicators of compromise are provided. A service provider computer implementing features described herein may categorize and prioritize the indicators of compromise so that higher priority indicators of compromise are acted upon thus minimizing potential performance bottlenecks and ensuring the best use of finite operational resource for an organization. Systems can utilize a set of factors to categorize and prioritize certain indicators of compromise that are relevant to network resources of an organization without taking unnecessary actions that can lead to inefficient use of computational resources. Further, systems can determine and associate lifecycles for each indicator of compromise thus ensuring that implementing security controls for network resources occurs for active indicators of compromise and generating further resource efficiencies for the organization. In embodiments, the service provider computer can implement particular security controls such as rule sets to provide to various network resources to detect and prevent intrusion or malicious activity. Moreover, the service provider computer can generate reports or other information to share with an indicator of compromise information sharing network that proliferates malicious entities or activity to ensure a more stable and secure environment for one or more organizations.

Some embodiments of the invention are directed to a method for prioritizing indicators of compromise for a network including receiving, by a server computer, information identifying an indicator of compromise for a network resource of an organization associated with the network. The information may comprise at least one of an identification of a severity for the indicator of compromise provided by a reporting entity or a confidence of the reporting entity in the identification of the indicator of compromise. The method may further include calculating, by the server computer, a normalized severity for the indicator of compromise based at least in part on a set of factors. The server computer may determine a lifecycle to associate with the indicator of compromise based at least in part on the normalized severity for the indicator of compromise. In some embodiments, the server computer may update a database associated with the network indicating the normalized severity and the lifecycle for the indicator of compromise. The method may also include generating, by the server computer, a set of rules to apply to the network resource based at least in part on the indicator of compromise and the normalized severity for the indicator of compromise. The server computer may provide the set of rules to the network resource for implementation where the network resource is configured to detect and prevent subsequent occurrences of the indicator of compromise utilizing the set of rules.

In some embodiments, the method may also include that the set of factors may comprise the identification of the severity for the indicator of compromise provided by the reporting entity, the confidence of the reporting entity in the identification of the indicator of compromise, a type of the indicator of compromise, a confidence score associated with the reporting entity provided by the organization, and collision logging information that indicates occurrences of the indicator of compromise within a plurality of network resources of the network subsequent to receiving the information.

In some embodiments, the method may also include verifying, by the server computer, the indicator of compromise and the reporting entity based at least in part on a whitelist of indicators of compromise and reporting entities maintained in the database associated with the network.

In some embodiments, the method may also include generating, by the server computer, an alert based at least in part on the information identifying the indicator of compromise for the network resource and a watchlist of indicators of compromise maintained by the organization, the alert including the information, and transmitting, by the server computer, the alert to a user device of an entity associated with the organization.

In some embodiments, the method may further comprise implementing, by the server computer, a detection sensor check for the network resource based at least in part on the alert and a type of the indicator of compromise.

In some embodiments, the method may further comprise updating, by the server computer, a whitelist of indicators of compromise and reporting entities maintained in the database associated with the network based at least in part on the normalized severity for the indicator of compromise.

In some embodiments, updating the database associated with the network indicating the normalized severity for the indicator of compromise includes setting an active tag for a data entry associated with the indicator of compromise based at least in part on the lifecycle associated with the indicator of compromise.

In some embodiments, updating the database associated with the network indicating the normalized severity for the indicator of compromise includes updating the active tag for the data entry associated with the indicator of compromise upon expiration of the lifecycle associated with the indicator of compromise.

In some embodiments, generating the set of rules to apply to the network resource is further based at least in part on a sensor threshold associated with the network resource.

Some embodiments of the invention are directed to an electronic device comprising: a processor, and a memory including instructions that, when executed with the processor, cause the system to at least: receive information identifying an indicator of compromise for a network resource of a network associated with an organization. The information may include at least one of an identification of a severity for the indicator of compromise provided by a reporting entity or a confidence of the reporting entity in the identification of the indicator of compromise. The instructions may further cause the system to calculate a normalized severity for the indicator of compromise based at least in part on a set of factors. A lifecycle to associate with the indicator of compromise may be determined by the system based at least in part on the normalized severity for the indicator of compromise. The instructions may further cause the system to generate a report identifying the indicator of compromise, the normalized severity for the indicator of compromise, and the lifecycle for the indicator of compromise. The instructions may further cause the system to transmit the report to an indicator of compromise information sharing network.

In some embodiments, generating the report is based at least in part on an information sharing threshold maintained by the organization.

In some embodiments, transmitting the report to the indicator of compromise information sharing network is based at least in part on a policy specified by a standard setting organization.

In some embodiments, transmitting the report to the indicator of compromise information sharing network is based at least in part on a policy specified by the organization where the policy identifies information classification restrictions associated with particular indicators of compromise.

In some embodiments, the instructions when executed with the processor cause the system to further generate a set of rules to apply to the network resource based at least in part on the indicator of compromise and the normalized severity for the indicator of compromise.

In some embodiments, the set of rules to apply to the network resource are updated based at least in part on the lifecycle associated with the indicator of compromise.

Some embodiments of the invention are directed to a method for prioritizing indicators of compromise for a network including receiving, at a server computer, information identifying an indicator of compromise for a network resource of an organization associated with the network. The information may comprise at least one of a type of the indicator of compromise or an identification of a severity for the indicator of compromise provided by a reporting entity. The method may further include calculating, by the server computer, a normalized severity for the indicator of compromise based at least in part on a set of factors. The method may also include determining, by the server computer, a lifecycle to associate with the indicator of compromise based at least in part on the normalized severity for the indicator of compromise. In embodiments, the server computer may generate a set of rules to apply to the network resource based at least in part on the indicator of compromise and the normalized severity for the indicator of compromise. The method may include transmitting, by the server computer, the set of rules to the network resource thereby configuring the network resource to detect subsequent occurrences of the indicator of compromise.

In some embodiments, the method may further include updating the normalized severity for the indicator of compromise based at least in part on input provided by an entity associated with the organization.

In some embodiments, the method may further comprise updating the normalized severity for the indicator of compromise and the lifecycle associated with the indicator of compromise based at least in part on other information identifying one or more indicators of compromise for the network resource that are provided by a plurality of reporting entities.

In some embodiments, updating the normalized severity for the indicator of compromise and the lifecycle associated with the indicator of compromise occurs periodically.

In some embodiments, the method may further comprise generating a report identifying the indicator of compromise and the normalized severity for the indicator of compromise, the report configured to be presented to a user via a user device.

Other embodiments of the invention are directed to servers and systems that are configured to perform the above-described methods.

These and other embodiments of the invention are described in further detail below.

BRIEF DESCRIPTION OF THE DRAWINGS

Various embodiments in accordance with the present disclosure will be described with reference to the drawings, in which.

DETAILED DESCRIPTION

Prior to discussing embodiments of the invention descriptions of some terms may be helpful in understanding embodiments of the invention.

An "indicator of compromise" may include a technical artifact such as an internet protocol (IP) address, a domain name, a file hash, a uniform resource locator address (URL), a file name, a user name, an email address, a user agent, a process hash, a process name, a registry key, a virus, or path. Indicators of compromise may include a forensic artifact or remnant of an intrusion that can be identified on a host or network. The indicators of compromise may be associated with tools, tactics, techniques, and procedures utilized by malicious actors. The indicators of compromise are associated with specific malicious activity from malicious actors such as spam proliferators or virus proliferators.

A "network resource" may include any suitable component of a computer network. Examples include a router, database, virtual machine, firewall, web proxy, server computer, user device, routing table, domain server, or any suitable network security device or software including router logs or network reporting devices.

A "reporting entity" may include any suitable entity that can report an event. In some embodiments, a reporting entity can include a security threat or indicator of compromise intelligence vendor. A reporting entity may be a member of an information sharing network that proliferates knowledge and intelligence regarding security threats and indicators of compromise encountered by themselves or other participating members of the information sharing network.

"Normalized severity" may include any suitable value that conveys the threat level of an indicator of compromise. The normalized severity may be utilized by an organization utilizing the prioritizing and categorization of indicators of compromise service described herein. Normalized severity may include the following descriptors and actions taken by network sensors or network security devices:

TABLE 1

| Severity | Sensor Action |
| --- | --- |
| CRITICAL | Prevent/Alert |
| HIGH | Detect/Alert |
| MEDIUM | Detect or Monitor/Log |
| LOW | No deployment/No action |
| UNKNOWN | Not enough information - No action |

As shown above, a normalized severity value can be characterized by relative terms such as "critical," "high," "medium," "low," and "unknown." Normalized severity can include a dynamic value that represents an initial threat level assessment for an indicator of compromise as reported by a reporting entity. Normalized severity may serve as an indicator of severity level that is uniquely assigned per source reporting the same indicator of compromise. Normalized severity can be used for sensor enrichment/integration, information sharing, or alerting. In embodiments, normalized severity may also refer to an aggregate of normalized severity values for an indicator of compromise. In embodiments, normalized severity may be determined based on a set of factors and dynamically updated as new information is received from the same reporting entity or other reporting entities regarding the indicator of compromise. In some embodiments, the normalized severity may be updated or changed manually by an entity associated with an organization implementing or utilizing the prioritization and categorization of indicators of compromise service described herein. Examples of indicators of compromise with assigned normalized severity may include:

TABLE 2

| Indicator Example | Normalized Severity |
| --- | --- |
| 1.1.1.1 | HIGH |
| 4.4.4.4 | MEDIUM |
| Baddomain1.com | MEDIUM |
| Baddomain2.com | CRITICAL |
| badsender@gmail.com | UNKNOWN |

A "set of factors" may include one or more components utilized to calculate the normalized severity for an indicator of compromise. The components may include at least one of a source reported severity for the indicator of compromise that represents how dangerous the indicator of compromise is, as provided by the reporting entity; source reported confidence in the identification and severity of the indicator of compromise as provided by the reporting entity that represents the confidence of the reporting entity in their assertion of the severity; an organizations confidence in the reporting entity that represents how much the organization trusts the reporting entity and how relevant the indicator of compromise is to the organization; information identifying that the indicator of compromise is already or has been detected by the organizations security devices and/or sensors, the information may show up in network resource logs, or a type of indicator of compromise (i.e., IP address, domain name, etc.).

A "lifecycle" may include a period of time for an indicator of compromise to remain active for generating a set of rules or sensor enrichment, information sharing, or generating alerts. By utilizing a lifecycle only relevant indicators of compromise are analyzed and acted upon by the prioritizing and categorizing of indicators of compromise service described herein ensuring that limited resources are utilized in an efficient manner. An organization may assign default lifecycles based on the determined normalized severity for an indicator of compromise such as:

TABLE 3

| Normalized Severity | Default lifespan |
| --- | --- |
| CRITICAL | 21 days |
| HIGH | 7 days |
| MEDIUM | 3 days |
| LOW | 0 days |
| UNKNOWN | n/a |

In some embodiments, an organization may generate other suitable lifecycles or time periods to associate with indicators of compromise based at least in part on the normalized severity for the indicator of compromise. In embodiments, the prioritization and categorization of indicators of compromise service described herein may update a database that maintains a status of indicators of compromise such as active or inactive. The status may be utilized by service provider computers to generate rule sets, configure resources for sensor enrichment, generate alerts, or proliferate information to the information sharing network. Examples of status include an active status identifying that an indicator of compromise may be a candidate for action based on the normalized severity for the event; an inactive status identifying that an indicator of compromise is no longer a candidate for action; an immortal status identifying that an active status for a particular indicator of compromise will never expire and may indefinitely be considered a candidate for action; or deleted indicating that a particular indicator of compromise has been selected for deletion by an analyst or entity associated with an organization.

A "set of rules" or "sensor enrichment" may include any suitable set of instructions generated by the service provider computer and/or server computer implementing the prioritization and categorization of indicators of compromise service described herein for configuring network resources or computer resources to detect and prevent occurrences of an indicator of compromise. The set of rules may instruct and/or configure network resources, network security devices, or any suitable computer resource to sense, detect, and prevent instances of the indicator of compromise. A non-limiting example may include a set of instructions identifying a list of malicious IP addresses that are transmitted to a firewall for subsequent blocking. The set of rules may instruct a network security sensor or device to query or search for instances of an indicator of compromise, such as searching for instances of a hash value, for indicators of compromise that may not appear in security logs. A database associated with the organization may maintain and track the set of rules generated and transmitted to computer resources of a network associated with the organization.

"Information sharing" may include generating and transmitting a report including information about an indicator of compromise detected by computer resources of an organization. In some embodiments, an organization may share or provide information and/or a report including a determined normalized severity for an indicator of compromise, a lifecycle for the indicator of compromise, and other suitable information about the indicator of compromise (type of indicator of compromise) to other entities or members of an information sharing network. An "information sharing network" may be an organization or network of members who desire to proliferate information to maintain a stable and secure network environment for computer resources.

A "whitelist" may include any suitable information for identifying benign indicators of compromise or entities maintained by an organization. The indicators of compromise or entities included in the whitelist may be disregarded for the purposes of identifying security threats and calculating normalized severity as described herein.

A "watchlist" may include any suitable information for identifying indicators of compromise, security threats, patterns, or reporting entities that require close surveillance. For example, the watchlist may include information that identifies particular indicators of compromise or reporting entities that necessitate immediate action such as the generation of alerts or reports to entities of the organization or members of an information sharing network. As a non-limiting example, a watchlist may include a set of policies that indicate that any new IP addresses from a particular network that are reported or received as indicators of compromise necessitate generation of an immediate alert for an analyst or other entity associated with an organization.

A "server computer" may be a powerful computer or cluster of computers. For example, the server computer can be a large mainframe, a minicomputer cluster, or a group of servers functioning as a unit. The server computer may be associated with an entity such as a payment processing network, a wallet provider, a merchant, an authentication cloud, an acquirer or an issuer. A user device computer or service provider computer may all be examples of server computers.

A "user device" may be any type of computing device such as, but not limited to, a mobile phone, a smart phone, a personal digital assistant (PDA), a laptop computer, a desktop computer, a server computer, a thin-client device, a tablet PC, a vehicle such as an automobile, etc. Additionally, user devices may be any type of wearable technology device, such as a watch, earpiece, glasses, etc. A user device may include one or more processors capable of processing user input. The user device may also include one or more input sensors for receiving user input. As is known in the art, there are a variety of input sensors capable of detecting user input, such as accelerometers, cameras, microphones, etc. The user input obtained by the input sensors may be from a variety of data input types, including, but not limited to, audio data, visual data, or biometric data. The user device may comprise any electronic device that may be operated by a user, which may also provide remote communication capabilities to a network. Examples of remote communication capabilities include using a mobile phone (wireless) network, wireless data network (e.g., 3G, 4G or similar networks), Wi-Fi, or any other communication medium that may provide access to a network such as the Internet or a private network.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described herein include a system and platform for prioritizing and categorizing indicators of compromise for taking actions to ensure computer resource security. The indicator of compromise prioritization and categorization system can utilize a set of factors associated with an indicator of compromise to calculate a normalized severity and lifecycle for the indicator of compromise. Further, certain actions can be taken by the system to ensure system security such as generating a set of rules, an alert, or transmitting information to other entities based on the normalized severity and lifecycle for the indicator of compromise. Computer resources, including network security devices, can be utilized in an efficient manner by only acting on indicators of compromise of a certain normalized severity thus reducing any bottlenecking of resources that may occur when attempting to analyze and act on a large amount of indicators of compromise received and/or detected by an organization.

Figure 1:
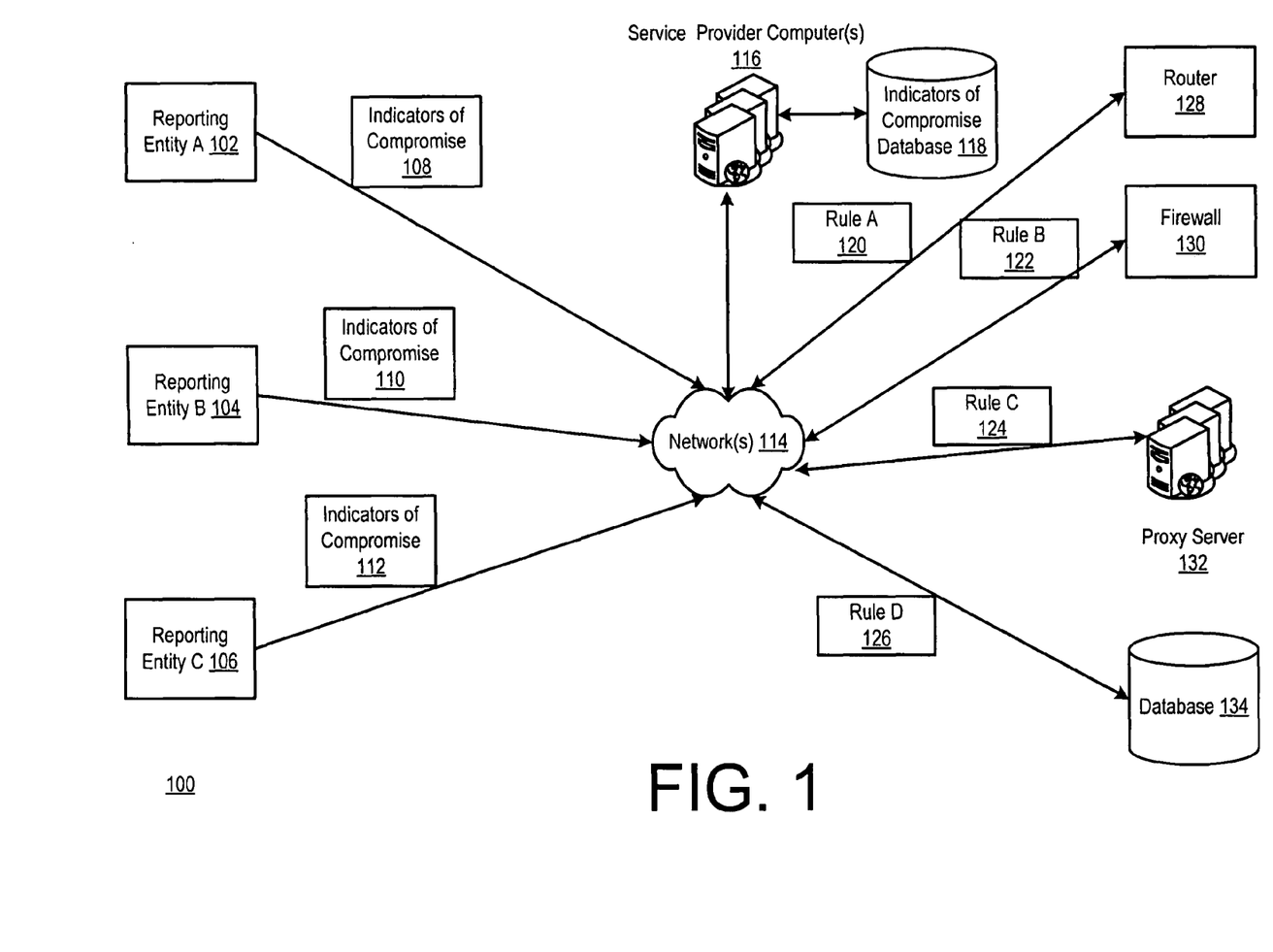
FIG. 1 depicts an example system illustrating an categorization and prioritization process utilizing a server implemented system with one or more reporting entities provided various indicators of compromise, comprising a number of components and in accordance with some embodiments of the invention.

FIG. 1 depicts an exemplary system according to an embodiment of the invention.

Embodiments of the invention can include a prioritization and categorization process utilizing a server implemented system for analyzing indicators of compromise and performing actions to ensure security of computer resources, comprising a number of components and in accordance with some embodiments of the invention. The process 100 illustrated in FIG. 1 includes one or more reporting entities, such as reporting entity A 102, reporting entity B 104, and reporting entity C 106, providing indicators of compromise 108-112 via a network 114 to service provider computers 116. The network 114 may include a wireless network, Wi-FI, wireless data network (e.g., 3G, 4G, or similar networks), or any other communication medium that may provide access to a public or private network. In embodiments, the service provider computers 116 may implement the prioritization and categorization features described herein. In some embodiments, the service provider computers 116 may maintain and update information about indicators of compromise in an indicator of compromise database 118. As described herein, the service provider computers 116 may calculate a normalized severity for the indicators of compromise 108, 110, and 112. In some embodiments, the service provider computers 116 may calculate the normalized severity for the indicators of compromise 108-112 based on a set of factors. In accordance with at least one embodiment, the service provider computers 116 may update the normalized severity for a particular indicator of compromise based on information received at different times from the same source (such as reporting entity A 102) or based on information about the same particular indicator of compromise from multiple sources (such as reporting entities A 102 and B 104). Although FIG. 1 includes three reporting entities (102-106) it should be understood that the service provider computers 116 may be configured to receive and process more indicators of compromise provided by a plurality of reporting entities.

In some embodiments, the service provider computers 116 may determine a lifecycle to associate with the normalized severity determined for an indicator of compromise that may correspond to the indicators of compromise 108-112. In embodiments, the higher or more severe the normalized severity is for the indicator of compromise, the longer the lifecycle will be. Examples of default lifecycles are described herein. In some embodiments, a security analyst, or entity associated with an organization of the service provider computers 116 may specify a lifecycle for the indicator of compromise utilizing the normalized severity. In accordance with at least one embodiment, the service provider computers 116 may undertake one or more actions for computer resources of a network associated with an organization that is participating in or associated with the priority and categorization of indicators of compromise service described herein. For example, the service provider computers 116 may generate one or more alarms to be transmitted to a user device of a security analyst or entity of an organization. In some embodiments, the service provider computers 116 may generate a report about the indicator of compromise and other related information such as the normalized severity, type of indicator of compromise, and lifecycle that can be provided to members of an information sharing network.

In some embodiments, the service provider computers 116 may generate a set of rules 120-126 for enriching or configuring computer resources 128-134 that are associated with an organization. The set of rules 120-126 may each be generated based on the type of indicator of compromise, the normalized severity, and the type of computer resource intended as the recipient for the rule. As described herein, a rule, such as rule A 120, may include a set of instructions for configuring router 128 to detect and prevent instances of the indicator of compromise (such as indicators of compromise corresponding to indicators of compromise 108-112). In embodiments, an organization may be associated with service provider computers 116 for analyzing indicators of compromise as described herein or may be a participating member in a service provided by the service provider computers 116 for analyzing and performing actions (such as generating rules) for computer resources 128-134. Rules 120-126 may be generated for indicators of compromise based on the normalized severity and lifecycle associated with the indicator of compromise. This prevents the service provider computers 116 from being misused or inefficiently used to generate rules for indicators of compromise that are not deemed a threat according to their normalized severity. In an embodiment, the service provider computers 116 may maintain a whitelist in indicators of compromise database 118 for identifying benign indicators of compromise and/or reporting entities that require no action. This further increases the computational efficiencies by freeing up the service provider computers 116 to analyze and perform actions for other indicators of compromise such as calculating normalized severities and lifecycles. In some embodiments, the service provider computers 116 may utilize a watchlist that is maintained in the indicators of compromise database 118 to identify indicators of compromise that require immediate action such as generating alerts that may be further transmitted to user devices of entities associated with an organization or generating reports to proliferate to other members of an information sharing network. The watchlist may include information identifying one or more policies for selecting particular indicators of compromise that require immediate attention and action. The watchlist may also include information that identifies particular reporting entities or patterns identified in the received indicators of compromise 108-112 such as multiple indicators of compromise being provided by the same entity within a certain amount of time.

Figure 2:
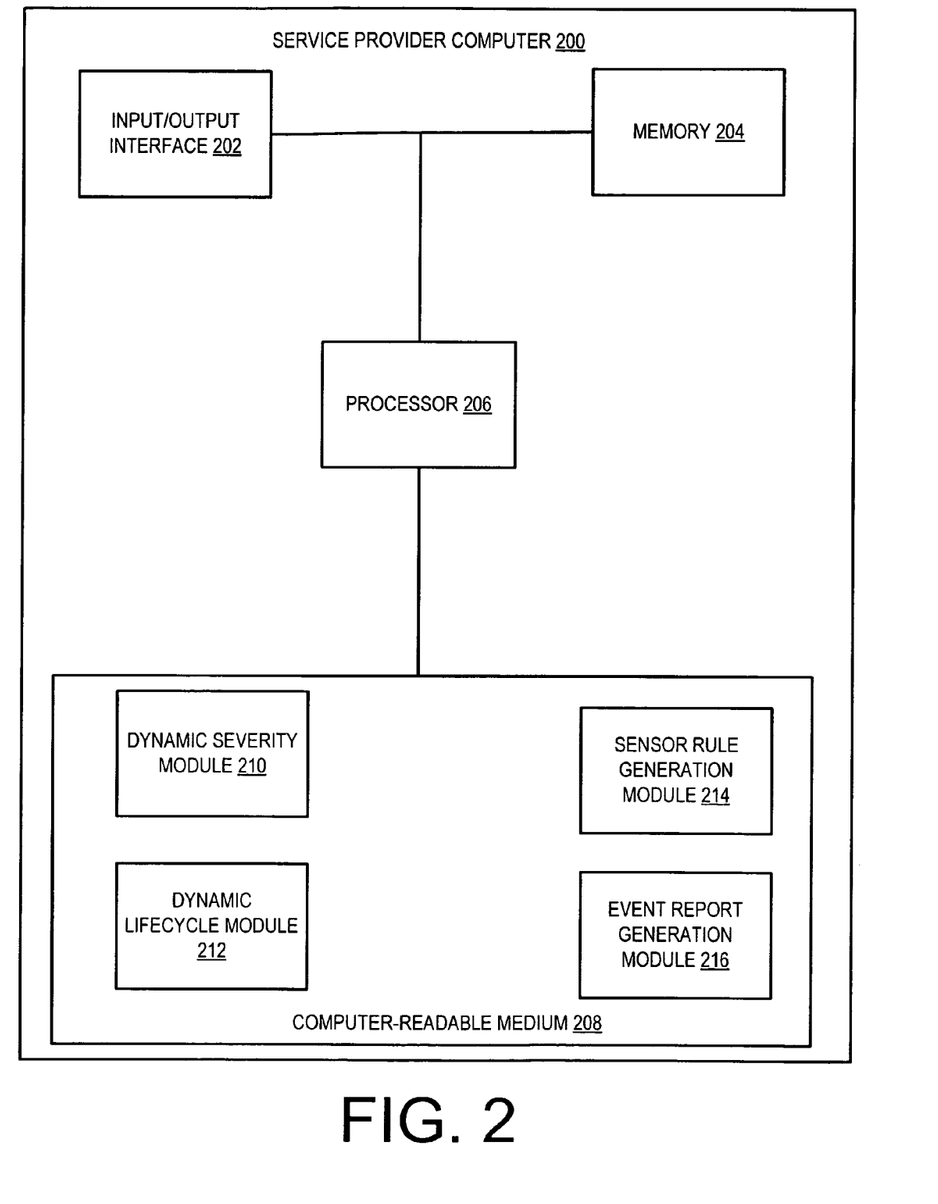
FIG. 2 depicts a block diagram of a service provider computer, in accordance with some embodiments of the invention.

FIG. 2 depicts a block diagram of a service provider computer 200, in accordance with some embodiments of the invention. The service provider computer 200 includes an input/output interface 202, memory 204, a processor 206, and computer readable medium 208. The service provider computer 200 may be an example of service provider computers 116 from FIG. 1.

The input/output (I/O) interface 202 is configured to receive and transmit data. For example, the I/O interface 202 may receive indicators of compromise in the form of indicators of compromise 108-112 from the reporting entities 102-106 (FIG. 1) or from other members of an information sharing network or components of a network associated with an organization such as network security devices. In another example, the I/O interface 202 may transmit rules or sets of rules 120-126 and/or reports to computer resources 128-134 (FIG. 1) or other participating entities in an information sharing network. The I/O interface 202 may transmit alerts or alarms to security analysts or other entities associated with an organization that implements a network of computer resources for further action. The I/O interface 202 may also be used for direct interaction with the service provider computer 116. The I/O interface 202 may accept input from an input device such as, but not limited to, a keyboard, keypad, camera, microphone, mouse, or any other suitable input hardware and/or software associated with a user device computer or the service provider computer 200. Further, the I/O interface may display output on a display device.

Memory 204 may be any magnetic, electronic, or optical memory. It can be appreciated that memory 204 may include any number of memory modules. An example of memory 204 may be dynamic random access memory (DRAM).

Processor 206 may be any general-purpose processor operable to carry out instructions on the service provider computer 200. The processor 206 is coupled to other units of the user device computer 200 including input/output interface 202, memory 204, and computer-readable medium 208.

Computer-readable medium 208 may be any magnetic, electronic, optical, or other computer-readable storage medium. Computer-readable storage medium 208 includes dynamic severity module 210, dynamic lifecycle module 212, sensor rule generation module 214, and event report generation module 216.

The dynamic severity module 210 may be configured to, when executed by processor 206, calculate a normalized severity for an indicator of compromise utilizing a set of factors. For example, the dynamic severity module 210 may utilize indicators of compromise 108-112 from reporting entities 102-106 to determine a normalized severity for a particular indicator of compromise or for one or more indicators of compromise represented by the indicators of compromise 108-112. Further, the dynamic severity module 210 may be configured to update the normalized severity for an indicator of compromise based on new information received from reporting entities. For example, a particular indicator of compromise may initially be calculated as a medium normalized severity. However, upon receiving new information, such as indicators of compromise 108 and 110, the dynamic severity module 210 may update or recalculate the normalized severity for the particular indicator of compromise which results in a normalized severity of critical. In some embodiments, the dynamic severity module 210 may be configured to update or alter the normalized severity for an indicator of compromise based at least in part on input provided by an entity associated with an organization such as a security analyst. The security analyst or entity may utilize a user device to provide the input. In some embodiments, the dynamic severity module 210 may be configured to run a query or search on security logs, usage logs, or other computer resource usage information to detect occurrences of an event corresponding to the indicator of compromise in question. This is a data point that can be utilized to calculate a normalized severity for the indicator of compromise. The calculated normalized severity for an indicator of compromise may be maintained in a database associated with the service provider computer 200 such as database 118 (FIG. 1).

The dynamic lifecycle module 212 may be configured to, when executed by processor 206, determine a lifecycle to associate with an indicator of compromise based at least in part on the normalized severity for the indicator of compromise. As described herein, the dynamic lifecycle module 212 may associate a longer period of time or a greater lifecycle based on how severe of a threat the indicator of compromise is determined based on its normalized severity. In other words, indicators of compromise that are critical or high are associated with a longer lifecycle than indicators of compromise that are low or medium. The dynamic lifecycle module 212 may be configured to update the associated lifecycle for an indicator of compromise based on a new or updated normalized severity for an indicator of compromise. For example, the lifecycle for a particular indicator of compromise may increase based on the normalized severity for the indicator of compromise increasing. In some embodiments, the dynamic lifecycle module 212 may be configured to update or associate a lifecycle with an indicator of compromise based on input provided by an entity associated with an organization or the service such as a security analyst. In embodiments, the dynamic lifecycle module 212 may be configured to set the status of an indicator of compromise to active, inactive, etc., based on information indicating when the indicator of compromise was processed and a current time period. For example, the dynamic lifecycle module 212 may maintain an incremental counter indicating the active state of an indicator of compromise based on the lifecycle and other information indicating initial processing and current time period. Upon expiration of a lifecycle for an indicator of compromise, the dynamic lifecycle module 212 may set the status for the indicator of compromise to inactive.

The sensor rule generation module 214 may be configured to, when executed by processor 206, generate a set of rules or one or more rules such as rules 120-126 (FIG. 1) for instructing or configuring computer resources, such as computer resources 128-134, to detect and prevent occurrences of the indicator of compromise in a network of computer resources associated with an organization (FIG. 1). The sensor rule generation module 214 may transmit the set of rules to each computer resource as indicated by the type of indicator of compromise in question. In some embodiments, the sensor rule generation module 214 may be configured to maintain a policy and threshold that is specified by an organization participating in the prioritization and categorization service described herein. The policies and thresholds may identify when rule sets are disseminated to the computer resources in question and further identify a level of severity before rules are transmitted to the computer resources. For example, an organization with limited operational resources may desire to only have rules generated and transmitted to computer resources when an indicator of compromise is calculated to have a normalized severity of critical. In embodiments, the sensor rule generation module 214 may be configured to maintain a whitelist of benign indicators of compromise and reporting entities. The whitelist may be checked prior to calculating a normalized severity for an indicator of compromise utilizing a matching process between the information in the whitelist and information associated with a received indicator of compromise.

The event report generation module 216 may be configured to, when executed by processor 206, generate a report or other information that may be provided to members of an information sharing network or to a user device of an entity, such as a security analyst, of a participating organization. The event report generation module 216 may be configured to generate alarms for transmittal to entities based on a watchlist maintained by the service provider computer 200. As described herein, the watchlist may include any suitable information for identifying indicators of compromise, security threats, patterns, or reporting entities that necessitate immediate action such as the generation of alerts or reports to entities of the organization or members of an information sharing network. In embodiments, the event report generation module 216 may identify particular indicators of compromise utilizing the watchlist prior to calculating a normalized severity and determining a lifecycle for an indicator of compromise. In some embodiments, the event report generation module 216 may be configured to maintain particular policies identifying classification restrictions for particular types of information that may be provided to other members of the information sharing network. For example, an organization may desire to keep confidential information about the organization from proliferating to other members of the information sharing network that can be obtained from a report generated by the event report generation module 216 for a particular indicator of compromise. In embodiments, the event report generation module 216 may be configured to redact or omit certain information for indicators of compromise according to the maintained policies. In embodiments, the event report generation module 216 may be configured to maintain a threshold that must be exceeded before information is provided, such as in a report, to entities or members of an information sharing network. For example, an organization may specify that indicators of compromise with a critical normalized severity may be included in a report for proliferation to the information sharing network.

Figure 3:
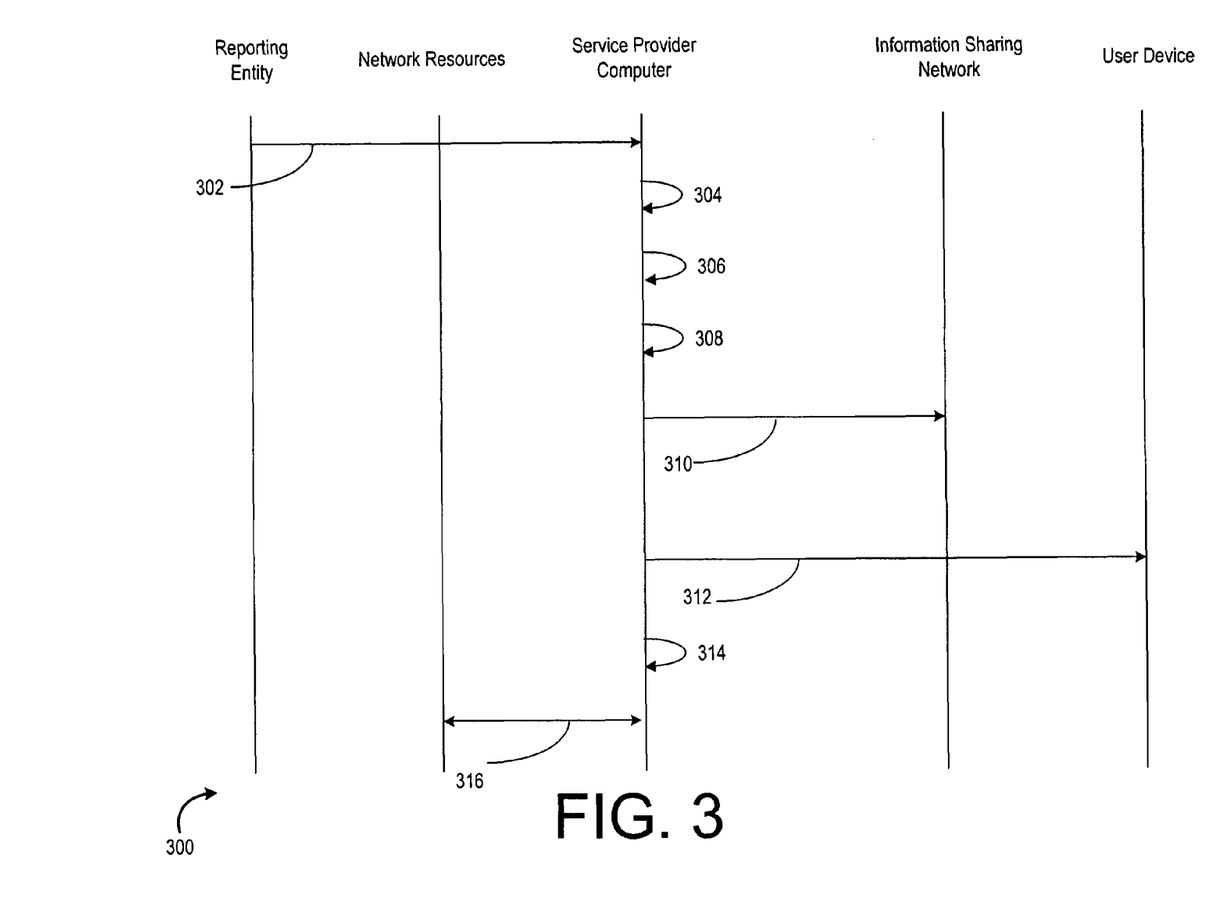
FIG. 3 depicts a diagram illustrating an example technique for prioritizing and categorizing indicators of compromise, in accordance with some embodiments of the invention.

FIG. 3 depicts a diagram illustrating an example technique for prioritizing and categorizing indicators of compromise, in accordance with some embodiments of the invention. The order in which the operations are described is not intended to be construed as a limitation, and any number of the described operations can be omitted or combined in any order and/or in parallel to implement this process and any other processes described herein.

Some or all of the process 300 (or any other processes described herein, or variations and/or combinations thereof) may be performed under the control of one or more computer systems configured with executable instructions and may be implemented as code (e.g., executable instructions, one or more computer programs or one or more applications). In accordance with at least one embodiment, the process 300 of FIG. 3 (as well as the other Figures in this application) may be performed by at least the one or more computer systems including service provider computers 116 (FIG. 1), or service provider computer 200 including modules 210-216. The code may be stored on a computer-readable storage medium, for example, in the form of a computer program including a plurality of instructions executable by one or more processors. The computer-readable storage medium may be non-transitory.

The process 300 may include receiving, by a service provider computer, information identifying an indicator of compromise for a network resource of an organization associated with the network at 302. In some embodiments, the information may comprise at least one of an identification of a severity for the indicator of compromise that is provided by a reporting entity or a confidence of the reporting entity in the identification of the indicator of compromise. The process 300 may include calculating, by the service provider computer, a normalized severity for the indicator of compromise based at least in part on a set of factors at 304. For example, the service provider computer may utilize a set of factors including a type of the indicator of compromise and a confidence score that represents the confidence of the organization in the reporting entity correctly assessing the indicator of compromise's severity. The process 300 may include determining a lifecycle to associate with the indicator of compromise based at least in part on the normalized severity for the indicator of compromise at 306. As described herein, the lifecycle may utilized to determine the status of an indicator of compromise for sensor enrichment and/or generation of reports for transmittal to an information sharing network.

The process 300 may include updating, by the service provider computer, a database associated with the network to maintain and indicate the normalized severity for the indicator of compromise and the lifecycle for the indicator of compromise at 308. In embodiments, the database may also be updated to indicate the status of the indicator of compromise by the service provider computer. The process 300 may include generating a report including information about the indicator of compromise, the normalized severity for the indicator of compromise, the associated lifecycle, and any other suitable information for transmitting to an information sharing network at 310 or for transmitting to an entity such as a security analyst's user device at 312. In some embodiments, the process 300 may include generating, by the service provider computer, a set of rules to apply to the network resource based at least in part on the indicator of compromise and the normalized severity for the indicator of compromise at 314. As described herein, the set of rules may configure or instruct the network resource or computer resource of an organization to detect and prevent occurrences of the indicator of compromise. The set of rules may be specified according to the type of indicator of compromise and the type of network resource and/or computer resource in question. In embodiments, the process 300 may include providing, by the service provider computer, the set of rules to the network resource for implementation at 316. For example, a set of malicious IP addresses may be provided to a firewall of an organization to prevent subsequent intrusion by the malicious IP addresses. Further, the service provider computer may update the normalized severity for the malicious IP addresses based on new indicators of compromise received from other reporting entities. In embodiments, the service provider computer may determine the updated lifecycle for the malicious IP addresses based on the newly calculated normalized severity for the malicious IP addresses (e.g., going from a lifecycle of 10 days to 27 days). As a result of updating the normalized severity and the lifecycle for the malicious IP addresses, the service provider computer may further update the active status in an associated database for the indicator of compromise. In some embodiments, the altering of the normalized severity for the malicious IP addresses may result in the service provider computers generating a report for proliferation to the information sharing network or provide new rule sets to other computer resources and/or network resources.

Figure 4:
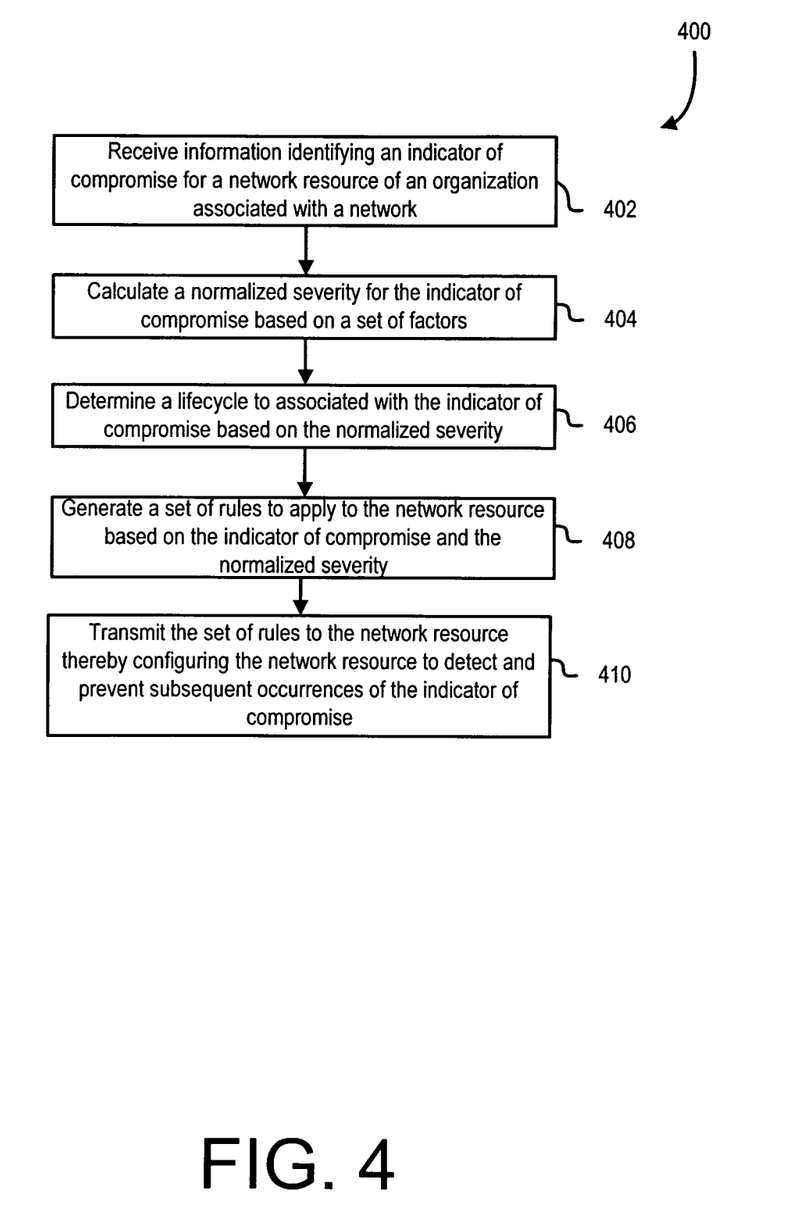
FIG. 4 depicts a flow diagram illustrating an example technique for prioritizing and categorizing indicators of compromise, in accordance with some embodiments of the invention.

FIG. 4 depicts a flow diagram illustrating an example technique for prioritizing and categorizing indicators of compromise, in accordance with some embodiments of the invention.

Some or all of the process 400 (or any other processes described herein, or variations and/or combinations thereof) may be performed under the control of one or more computer systems configured with executable instructions and may be implemented as code (e.g., executable instructions, one or more computer programs or one or more applications). In accordance with at least one embodiment, the process 400 of FIG. 4 may be performed by at least the one or more computer systems including service provider computers 116 (FIG. 1), or service provider computer 200 including modules 210-216. The code may be stored on a computer-readable storage medium, for example, in the form of a computer program including a plurality of instructions executable by one or more processors. The computer-readable storage medium may be non-transitory.

The process 400 may include receiving information identifying an indicator of compromise for a network resource of an organization associated with a network at 402. In embodiments, the information may comprise at least one of a type of the indicator of compromise or an identification of a severity for the indicator of compromise provided by a reporting entity. In some embodiments, the process 400 may include calculating a normalized severity for the indicator of compromise based on a set of factors at 404. The normalized severity may represent the threat that an indicator of compromise poses to a particular organization that is associated with a network of computer resources and/or network resources. The process 400 may include determining a lifecycle to associate with the indicator of compromise based at least in part on the normalized severity at 406. In some embodiments, the service provider computer may maintain and update (increment/decrement) the lifecycle for an indicator of compromise based on time information indicating when the indicator of compromise was processed and a current time period. The process 400 may include generating a set of rules to apply to the network resource based on the indicator of compromise and the normalized severity at 408. As described herein, the set of rules may configure or instruct the network resource or computer resource of an organization to detect and prevent occurrences of the indicator of compromise. In some embodiments, the process 400 may conclude at 410 by transmitting the set of rules to the network resource thereby configuring the network resource to detect and prevent subsequent occurrences of the indicator of compromise in the network of network resources of an organization. In some embodiments, the information identifying the indicator of compromise and the set of rules may be transmitted via one or more available networks.

The various participants and elements described herein with reference to FIGS. 1-4 may operate one or more computer apparatuses to facilitate the functions described herein. Any of the elements in FIGS. 1-4, including any servers or databases, may use any suitable number of subsystems to facilitate the functions described herein.

Figure 5:
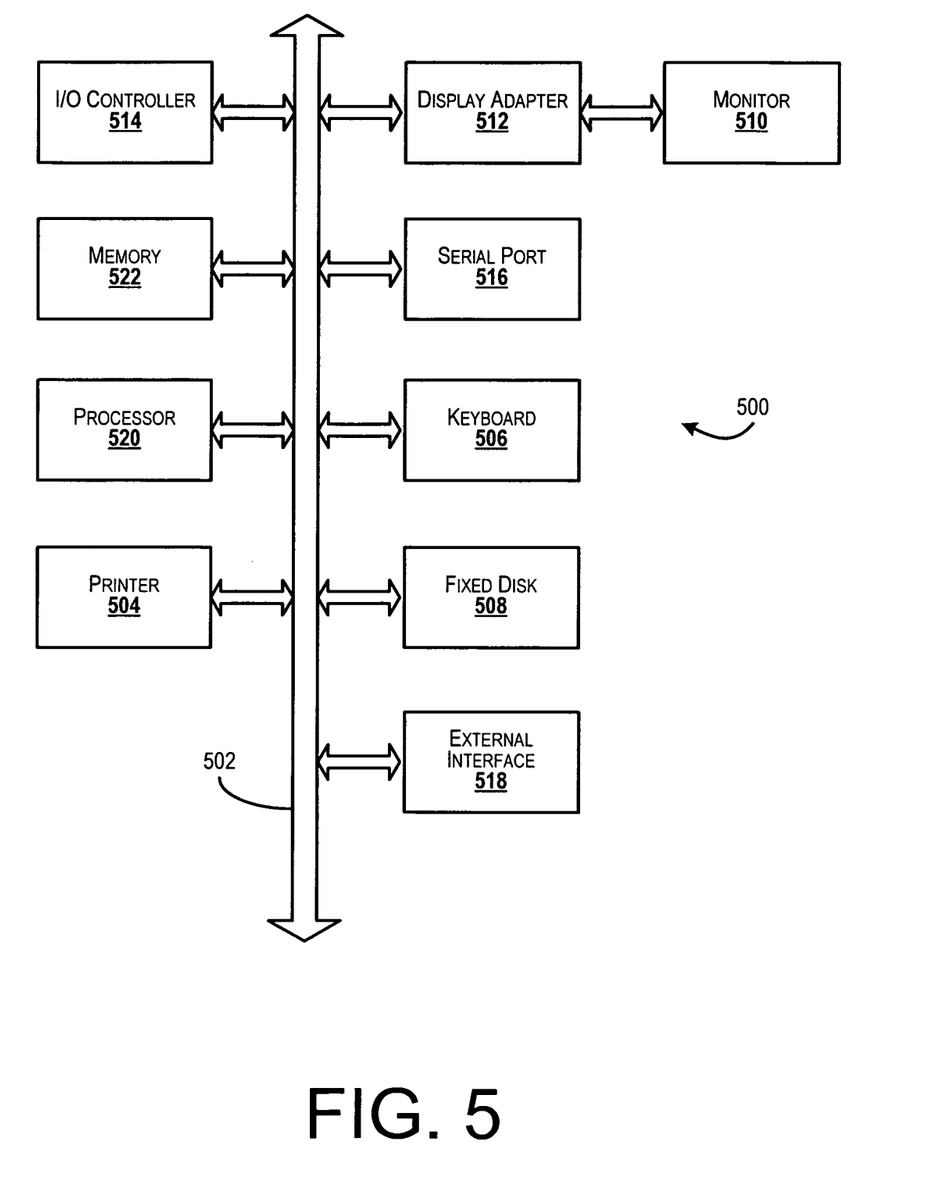
FIG. 5 depicts aspects of elements that may be present in a computer device and/or system configured to implement a method and/or process for prioritizing and categorizing indicators of compromise, in accordance with some embodiments of the invention.

Examples of such subsystems or components are shown in FIG. 5. The subsystems shown in FIG. 5 are interconnected via a system bus 502. Additional subsystems such as a printer 504, keyboard 506, fixed disk 508 (or other memory comprising computer readable media), monitor 510, which is coupled to display adapter 512, and others are shown. Peripherals and input/output (I/O) devices, which couple to I/O controller 514 (which can be a processor or other suitable controller), can be connected to the computer system by any number of means known in the art, such as serial port 516. For example, serial port 516 or external interface 518 can be used to connect the computer apparatus to a wide area network such as the Internet, a mouse input device, or a scanner. The interconnection via system bus allows the central processor 520 to communicate with each subsystem and to control the execution of instructions from system memory 522 or the fixed disk 508, as well as the exchange of information between subsystems. The system memory 522 and/or the fixed disk 508 may embody a computer readable medium.

Embodiments of the invention have a number of advantages. For example, because indicators of compromise are assigned normalized severity levels and lifecycles, an organization is capable of analyzing and properly identifying threats that require action despite receiving a large (e.g., over 1 million events a day) number of indicators of compromise from reporting entities. Further, particular threats may be identified by systems and methods described herein more efficiently by utilizing the normalized severity for faster information proliferation to members of an information sharing network. Systems and methods described herein allow for minimalizing the potential for performance bottlenecks and ensuring the best use of finite operation resources by utilizing the determined normalized severity and lifecycles of indicators of compromise. Moreover, by utilizing lifecycles and policies associated with an organization, systems and methods described herein allow for the organization to determine that indicators of compromise are relevant and current thereby freeing up more operation resources that can be utilized for other operations.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method for prioritizing indicators of compromise for a network, comprising:
   receiving, by a server computer, information identifying an indicator of compromise for a network resource of an organization associated with the network, the information comprising an least one of an identification of a severity for the indicator of compromise provided by a reporting entity or a confidence of the reporting entity in the identification of the indicator of compromise;
   calculating, by the server computer, a normalized severity for the indicator of compromise based at least in part on a set of factors comprising collision logging information that indicates occurrences of the indicator of compromise within a plurality of network resources of the network subsequent to receiving the information;
   determining, by the server computer, a lifecycle to associate with the indicator of compromise based at least in part on the normalized severity for the indicator of compromise;
   updating, by the server computer, a database associated with the network indicating the normalized severity for the indicator of compromise and the lifecycle of the indicator of compromise;
   generating, by the server computer, a set of rules to apply to the network resource based at least in part on the indicator of compromise and the normalized severity for the indicator of compromise; and
   providing, by the server computer, the set of rules to the network resource for implementation, the network resource configured to detect and prevent subsequent occurrences of the indicator of compromise utilizing the set of rules.

2. The method of claim 1, wherein the set of factors comprises the identification of the severity for the indicator of compromise provided by the reporting entity, the confidence of the reporting entity in the identification of the indicator of compromise, a type of the indicator of compromise, and a confidence score associated with the reporting entity provided by the organization.

3. The method of claim 1, further comprising verifying, by the server computer, the indicator of compromise and the reporting entity based at least in part on a whitelist of indicators of compromise and reporting entities maintained in the database associated with the network.

4. The method of claim 1, further comprising:
   generating, by the server computer, an alert based at least in part on the information identifying the indicator of compromise for the network resource and a watchlist of indicators of compromise maintained by the organization, the alert including the information; and transmitting, by the server computer, the alert to a user device of an entity associated with the organization.

5. The method of claim 4, further comprising implementing, by the server computer, a detection sensor check for the network resource based at least in part on the alert and a type of the indicator of compromise.

6. The method of claim 1, further comprising updating, by the server computer, a whitelist of indicators of compromise and reporting entities maintained in the database associated with the network based at least in part on the normalized severity for the indicator of compromise.

7. The method of claim 1, wherein updating the database associated with the network indicating the normalized severity for the indicator of compromise includes setting an active tag for a data entry associated with the indicator of compromise based at least in part on the lifecycle associated with the indicator of compromise.

8. The method of claim 7, wherein updating the database associated with the network indicating the normalized severity for the indicator of compromise includes updating the active tag for the data entry associated with the indicator of compromise upon expiration of the lifecycle associated with the indicator of compromise.

9. The method of claim 1, wherein generating the set of rules to apply to the network resource is further based at least in part on a sensor threshold associated with the network resource.

10. An electronic device comprising:
a processor; and
a memory including instructions that, when executed with the processor, cause the system to, at least:
receive information identifying an indicator of compromise for a network resource of a network associated with an organization, the information including at least one of an identification of a severity for the indicator of compromise provided by a reporting entity or a confidence of the reporting entity in the identification of the indicator of compromise;
calculate a normalized severity for the indicator of compromise based at least in part on a set of factors comprising collision logging information that indicates occurrences of the indicator of compromise within a plurality of network resources of the network subsequent to receiving the information;
determine a lifecycle to associate with the indicator of compromise based at least in part on the normalized severity for the indicator of compromise;
generate a report identifying the indicator of compromise, the normalized severity for the indicator of compromise, and a lifecycle for the indicator of compromise; and
transmit the report to an indicator of compromise information sharing network.

11. The electronic device of claim 10, wherein generating the report is based at least in part on an information sharing threshold maintained by the organization.

12. The electronic device of claim 10, wherein transmitting the report to the indicator of compromise information sharing network is based at least in part on a policy specified by a standard setting organization.

13. The electronic device of claim 10, wherein transmitting the report to the indicator of compromise information sharing network is based at least in part on a policy specified by the organization, the policy identifying information classification restrictions associated with particular indicators of compromise.

14. The electronic device of claim 10, wherein the instructions when executed with the processor cause the system to further at least generate a set of rules to apply to the network resource based at least in part on the indicator of compromise and the normalized severity for the indicator of compromise.

15. The electronic device of claim 14, wherein the set of rules to apply to the network resource are updated based at least in part on the lifecycle associated with the indicator of compromise.

16. A method for prioritizing indicators of compromise for a network, comprising:
receiving, at a server computer, information identifying an indicator of compromise for a network resource of an organization associated with the network, the information comprising at least one of a type of the indicator of compromise or an identification of a severity for the indicator of compromise provided by a reporting entity;
calculating, by the server computer, a normalized severity for the indicator of compromise based at least in part on a set of factors comprising collision logging information that indicates occurrences of the indicator of compromise within a plurality of network resources of the network subsequent to receiving the information;
determining, by the server computer, a lifecycle to associate with the indicator of compromise based at least in part on the normalized severity for the indicator of compromise;
generating, by the server computer, a set of rules to apply to the network resource based at least in part on the indicator of compromise and the normalized severity for the indicator of compromise; and
transmitting, by the server computer, the set of rules to the network resource thereby configuring the network resource to detect and prevent subsequent occurrences of the indicator of compromise.

17. The method of claim 16, further comprising updating the normalized severity for the indicator of compromise based at least in part on input provided by an entity associated with the organization.

18. The method of claim 16, further comprising updating the normalized severity for the indicator of compromise and the lifecycle associated with the indicator of compromise based at least in part on other information identifying one or more indicators of compromise for the network resource that are provided by a plurality of reporting entities.

19. The method of claim 18, wherein updating the normalized severity for the indicator of compromise and the lifecycle associated with the indicator of compromise occurs periodically.

20. The method of claim 16, further comprising generating a report identifying the indicator of compromise and the normalized severity for the indicator of compromise, the report configured to be presented to a user via a user device.

* * * * *

UNITED STATES PATENT AND TRADEMARK OFFICE
CERTIFICATE OF CORRECTION

PATENT NO.       : 9,900,335 B2                                    Page 1 of 1
APPLICATION NO.  : 14/757988
DATED            : February 20, 2018
INVENTOR(S)      : Desch et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 64 days.

Signed and Sealed this
Twenty-fifth Day of September, 2018

Andrei Iancu
*Director of the United States Patent and Trademark Office*